United States Patent [19]

Orlarey

[11] Patent Number: 4,751,444
[45] Date of Patent: Jun. 14, 1988

[54] DC MOTOR SYSTEM WITH AC AUXILIARY SYSTEM

[75] Inventor: Maurice M. Orlarey, Charlevoix, Mich.

[73] Assignee: Allied-Signal Inc., Morris Township, Morris County, N.J.

[21] Appl. No.: 855,655

[22] Filed: Apr. 25, 1986

[51] Int. Cl.⁴ .................. G05B 11/12; G01P 9/02
[52] U.S. Cl. ................... 318/648; 318/138; 74/5.4; 74/5.47; 74/5.00; 74/5.6 E; 74/5.7 R
[58] Field of Search ............... 318/648, 317, 318, 702, 318/138, 254, 439, 40, 41, 42, 49, 50, 52, 53, 81, 95; 74/5 R, 5.37, 5.34, 5.4, 5.43, 5.47, 5.5, 5.6 R:5.6 B, 5.6 C, 5.6 D, 5.6 E, 5.7, 5.8, 5.9; 73/504; 33/318, 321, 323, 324

[56] References Cited

U.S. PATENT DOCUMENTS

| | | | |
|---|---|---|---|
| 2,462,081 | 2/1949 | Esval | 318/648 |
| 2,805,383 | 9/1957 | Hurlburt . | |
| 2,842,468 | 7/1958 | Hurlburt . | |
| 3,203,261 | 8/1965 | Moore et al. . | |
| 3,234,799 | 2/1966 | Gubbins | 74/5.47 |
| 3,264,881 | 8/1966 | Poklar et al. | 74/5 X |
| 3,324,731 | 6/1967 | Burmeister et al. | 74/5.4 |
| 3,371,542 | 3/1968 | Swarts et al. | 74/5.47 |
| 3,604,276 | 9/1971 | Hurlbure | 74/5.47 |
| 3,875,488 | 4/1975 | Crocker et al. | 318/648 |
| 3,883,788 | 5/1975 | Storey | 318/648 |
| 3,909,690 | 9/1975 | Sugiura | 318/138 |
| 3,967,384 | 7/1976 | Swartz et al. | 74/5.4 X |
| 4,008,422 | 2/1977 | Sodekoda et al. | 318/138 |
| 4,158,795 | 6/1979 | Tarumi et al. | 318/138 |
| 4,161,884 | 7/1979 | Shigenobu | 74/5.47 X |
| 4,222,270 | 9/1980 | Allen | 318/648 X |
| 4,249,113 | 2/1981 | Werner | 318/39 |
| 4,266,432 | 5/1981 | Schroeder et al. | 74/5.7 |
| 4,270,387 | 6/1981 | Hoffman | 73/504 |
| 4,282,470 | 8/1981 | Reynolds | 318/648 |
| 4,351,194 | 9/1982 | Taylor | 74/5.7 X |
| 4,431,953 | 2/1984 | Schray et al. | 318/254 |
| 4,452,092 | 6/1984 | Dankwort | 74/5.6 E X |
| 4,487,083 | 12/1984 | Quermann | 74/5.46 |
| 4,588,933 | 5/1986 | Sun | 318/138 X |

Primary Examiner—William M. Shoop, Jr.
Assistant Examiner—Paul Ip
Attorney, Agent, or Firm—Howard G. Massung; Stanley N. Protigal

[57] ABSTRACT

A direct current (DC) powered gyroscope (41) utilizes an alternating current (AC) subsystem in which electrolytic switches (49, 50) control torquer motors (45, 46). The alternating current is obtained from commutation circuitry (21-23) in the gyroscope spin motor, so that the spin motor performs an inverter function. Advantages include reduced costs and the ability to operate the gyroscope (41) without an AC power supply.

16 Claims, 1 Drawing Sheet

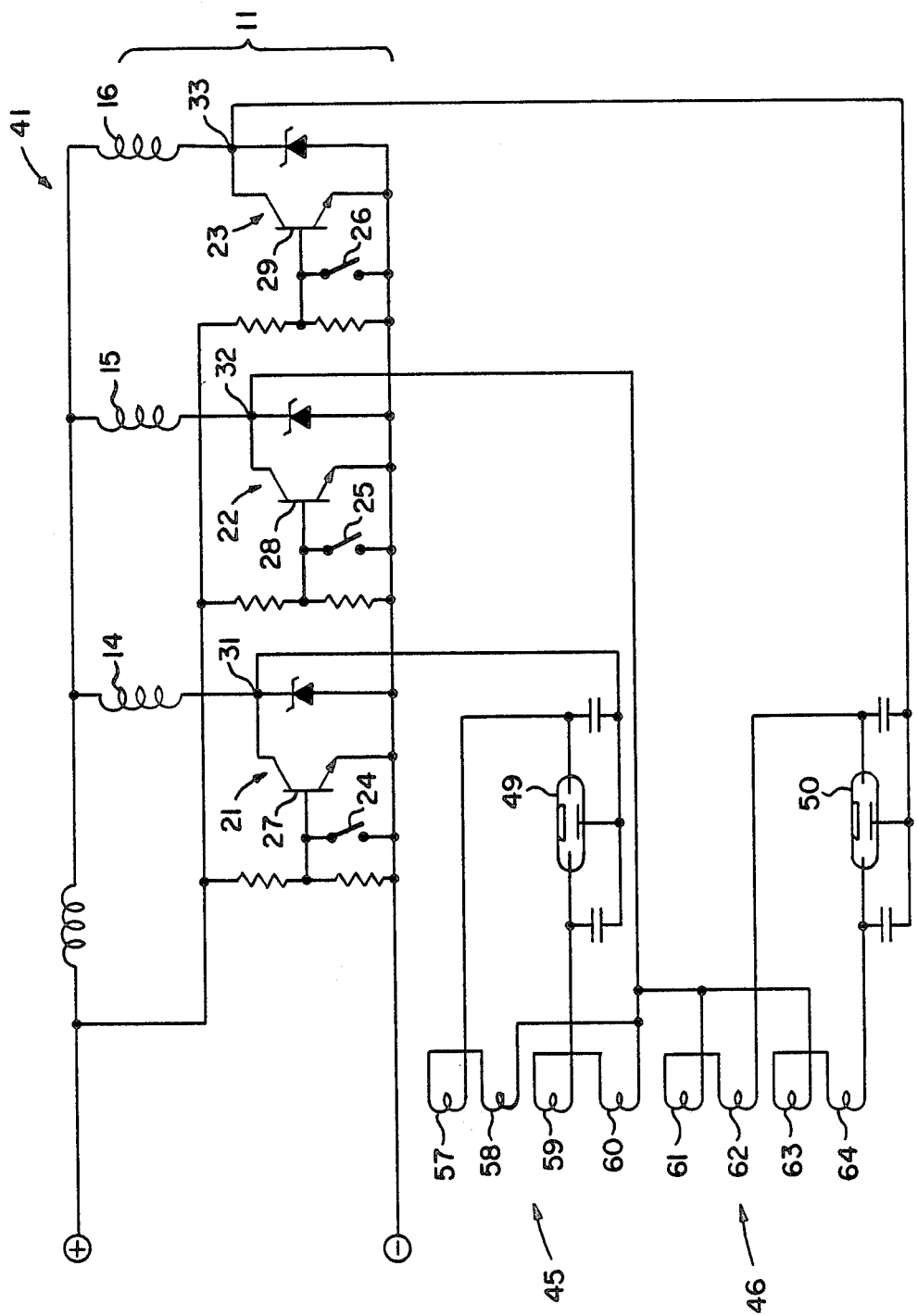

DC MOTOR SYSTEM WITH AC AUXILIARY SYSTEM

This invention relates to a commutated inductive system, such as a motor, which is operated on direct current (DC) and which has associated therewith an AC system. In its preferred embodiment, the invention relates to a mechanical gyroscope which includes a direct current (DC) motor and which employs an AC subsystem of torquer motors to precess the gyroscope about its gimbal axes. This invention has particular utility when used with vertical gyroscopes.

BACKGROUND OF THE INVENTION

Mechanical gyroscopes employ a spin motor to maintain gyroscope rotation. Such motors may be electrically powered and in some cases preferably operate off of a direct current (DC) power source. Such DC motors typically employ three magnetic poles which are commutated in order to achieve rotation. The gyroscope is caused to precess about one or more gimbal axes by torquer or precessor motors. In the case of a vertical gyroscope, the torquer motors may be controlled by electrolytic transducers or sensor switches which sense a level positions of the gyroscope. The electrolytic transducers function reliably on alternating current (AC), but they will not function at all when operated with direct current because their liquid will electrolyze. It is therefore mandatory, primarily because of this nature of the electrolytic switches, to operate the torquer motors with alternating current. This invention is directed to a particular method of obtaining alternating current from the direct current motor without the use of a separate inverter.

It is accordingly an object of the present invention to provide a simplified direct current gyroscope, in which alternating current may be derived from a direct current spin motor in order to operate an alternating current torquer system. It is a further object to provide a low cost and reliable system for inverting direct current from a commutated load in order to provide alternating current.

SUMMARY OF THE INVENTION

In accordance with the present invention, a gyroscope utilizing a direct current spin motor having at least three phases and which incorporates an AC torquer system. The AC torquer system derives its current supply from the spin motor. This current occurs as alternating current as a result the motor commutation.

BRIEF DESCRIPTION OF THE DRAWING

The drawing FIGURE schematically shows a direct current (DC) motor in which the motor's commutation system is used to provide power to an AC torquer system.

DETAILED DESCRIPTION OF THE PREFERRED EMBODIMENT

In the drawing FIGURE, a gyroscope includes a brushless direct current (DC) motor 11 which typically includes a plurality of windings 14, 15, 16, which are commutated by commutation circuits 21, 22, 23, respectively. In our gyro prototype, switches 24, 25 and 26 were magnetically actuated. Switches 24-26 were reed swtiches, but Hall effect switches or other types of commutation may be substituted without changing the concept of the invention. The commutation circuits 21-23 preferably include electronic switching elements 27-29 for controlling power applied to the windings 14-16. The commutation circuits 21-23 are connected to the windings 14-16 at connections 31-33 in order to sequentially energize the windings 14-16. These connections 31-33 establish the motor's poles.

While the motor 11 may be used for various applications, in the embodiment shown, the motor 11 is a spin motor for a vertical gyroscope 41. The gyroscope 41 also includes a pair of reversible torquer motors 45, 46, sometimes referred to as precessing motors. The torquer motors 45, 46 are attached to the gyroscope's gimbal arrangement (not shown) and control the attitude of the gyroscope spin axis. In their usual configuration, torquer motors 45, 46 are AC motors which are controlled in their operation by electrolytic transducers 49, 50.

Transducers 49, 50 are connected to motor windings 57-64 on the torquer motors 45, 46 in order to control the operation of the torquer motors 45, 46 in response to sensed level conditions. In the embodiment shown, torquer motor 45 and transducer 49 are used to control response along an input axis of the gyroscope 41, and torquer motor 46 and transducer 50 are used to control response along an output axis of the gyroscope 41. The electrolytic transducers 49, 50 utilize an electrolytic solution or other conductive liquid which contacts electrodes within a curved tube. Such transducers 49, 50 operate reliably when used with alternating current, but not when used with direct current.

In order to provide the alternating current for operating the torquer motors 45, 46 through their respective electrolytic transducers 49, 50, alternating current is derived from the commutator circuits 21-23. As can be seen, torquer motor 45 is connected to commutator circuits 21 and 22 at the outputs 31, 32 of commutator circuits 21 and 22. Torquer motor 46 is connected to commutator circuits 22 and 23, at outputs 32 and 33 of commutator circuits 22, 23. Electrolytic transducer 49 is connected between the output 31 of commutator circuit 21 and torquer motor 45, with output 32 of commutator circuit 22 establishing a common side connection for torquer motor 45. The output 32 of commutator circuit 22 also forms a common side connection for torquer motor 46, with electrolytic transducer 50 being connected between the output 33 of commutator circuit 23 and torquer motor 46.

Because of the commutated excitation of spin motor windings 14-16, the current across the outputs 31-33 occurs as alternating current in three phases. As can be seen as the above description, the torquer motors 45, 46 are respectively connected across two of the three phases of alternating current supplied by the commutator circuits 21-23. There are also other arrangements for connecting an AC system to the commutated outputs of circuits 21-23, as will be understood by those skilled in the art of AC power systems.

The present arrangement is most convenient when used with an electronically commutated spin motor having a rotating field as the rotor. The windings 14-16 therefore are a part of a stationary armature which is the motor's stator. It is also possible to derive alternating current from other types of commutation circuits, such as brush and commutation pole arrangements.

While the above is a specific embodiment of the invention, it is anticipated that the invention can be used with a variety of circuit applications in which a commutated motor is operated from direct current. The invention allows connections of a wide variety of AC circuits to different motor circuits where it is desired to provide such AC circuits with current at a frequency which tracks motor speed. Accordingly, it is intended that the invention be read as limited as only by the claims.

I claim:

1. Electrical system, operable from a direct current power supply, in which a plurality of inductive loads are commutated by commutation circuitry, with the commutation circuitry having respective output points and providing current to the inductive loads at said output connection points of the commutation circuitry, and which employs an auxiliary circuit operable by alternating current, comprising:

the auxiliary circuit including controller;

the auxiliary circuit being controlled by the controller irrespective of alternating current frequency variation; and the auxiliary circuit being connected to at least a pair of said output connection points in order to supply the alternating current to the auxiliary circuit.

2. Electrical system as described in claim 1, further comprising:

the inductive loads being commutated windings of an electric motor.

3. Electrical system as described in claim 2, further comprising:

the commutation circuitry providing current to the inductive loads in at least three phases.

4. Electrical system as described in claim 3, further comprising:

the commutation circuitry including electronic switching elements which control current flow to ones of the inductive loads.

5. Electrical system as described in claim 1, further comprising:

the commutation circuitry providing current to the inductive loads in at least three phases.

6. Electrical system as described in claim 5 further comprising:

the auxiliary circuit including and electrolytic switching device.

7. Electrical system as described in claim 1, further comprising:

the auxiliary circuit including an electrolytic switching device.

8. Electrical system as described in claim 1, further comprising:

the commutation circuitry including electronic switching elements which control current flow to ones of the inductive loads.

9. Gyroscope system which includes a direct current induction motor for causing a gyroscope rotor to rotate, wherein the induction motor has a plurality of windings which are commutated by commutation circuitry and which are connected to the commutation circuitry by a plurality of commutation circuit outputs, the gyroscope system further including at least one torquer motor operable by alternating current for precessing the gyroscope, further comprising:

a controller for controlling the torquer motor;

the torquer motor being controlled by the controller irrespective of alternating current frequency variation; and the torquer motor deriving its alternating current from at least two of the commutator circuit output connections.

10. Gyroscope system as described in claim 9, further comprising:

the commutation circuitry providing current to said windings in at least three phases; and the commutation circuitry including electronic switching elements which control current flow to ones of said windings.

11. Gyroscope system as described in claim 10 further comprising:

the torquer motor which includes being controlled by an electrolytic switching device.

12. Gyroscope system as described in claim 9, further comprising:

the torquer motor being controlled by an auxiliary circuit which includes an electrolytic switching device.

13. Electrical motor in which a plurality of substantially stationary windings are commutated by commutation circuitry, comprising:

an auxiliary circuit connected to the commutation circuitry;

a controller for controlling the auxiliary circuit;

the auxiliary circuit being controlled by the controller irrespective of alternating current frequency variation; and the auxiliary circuit being provided by the controller with alternating current produced by said commutation of the stationary windings.

14. Electrical motor as described in claim 13, further comprising:

the commutation circuitry providing current to the inductive loads in at least three phases.

the commutation circuitry including electronic switching elements which control current flow to ones of the inductive laods.

15. Electrical motor as described in claim 14 further comprising:

the auxiliary circuit including an electrolytic switching device.

16. Electrical motor as described in claim 13, further comprising:

the auxiliary circuit including an electrolytic switching device.

* * * * *